United States Patent [19]

Igarashi et al.

[11] Patent Number: 4,532,464
[45] Date of Patent: Jul. 30, 1985

[54] CONTROL APPARATUS FOR INDUCTION MOTOR

[75] Inventors: Sadayuki Igarashi, Funabashi; Hiroshi Nagase, Hitachi; Hisakazu Ninomiya, Funabashi; Sumio Kobayashi, Funabashi; Hiroyuki Tomita, Funabashi, all of Japan

[73] Assignees: Hitachi, Ltd.; Hitachi Keiyo Engineering Co., Ltd., both of Tokyo, Japan

[21] Appl. No.: 565,864

[22] Filed: Dec. 27, 1983

[30] Foreign Application Priority Data

Dec. 27, 1982 [JP] Japan ............... 57-226889

[51] Int. Cl.³ ............................................. H02P 5/40
[52] U.S. Cl. ................................. 318/807; 318/798
[58] Field of Search ................ 318/803, 807–812, 318/806, 798

[56] References Cited

U.S. PATENT DOCUMENTS

| | | | |
|---|---|---|---|
| 3,593,103 | 7/1971 | Chandler | 318/808 |
| 4,047,083 | 9/1977 | Plunkett | 318/807 |
| 4,259,845 | 4/1981 | Norbeck | 318/808 |
| 4,334,182 | 6/1982 | Landino | 318/808 |
| 4,419,615 | 12/1983 | Muto et al. | 318/811 |

*Primary Examiner*—David Smith, Jr.
*Attorney, Agent, or Firm*—Antonelli, Terry & Wands

[57] ABSTRACT

A control apparatus for an induction motor wherein an inverter is connected between a power source and the induction motor so as to energize the induction motor through the inverter, characterized in that when an input voltage of the inverter has lowered, a magnetizing current component command is decreased, while a torque current component command is increased.

9 Claims, 7 Drawing Figures

CONTROL APPARATUS FOR INDUCTION MOTOR

BACKGROUND OF THE INVENTION

The present invention relates to a control apparatus for induction motors which can individually instruct a torque current component and a magnetizing current component, wherein the equivalent circuit of an induction motor corresponding to one phase is as shown in FIG. 1.

$x_1$ denotes a primary leakage reactance, $r_1$ a primary resistance, $r_2'$ a secondary resistance (in terms of a primary value), and $x_m$ a magnetization reactance. In this figure, a secondary leakage reactance is omitted. Since, however, it is slight, it exerts no great influence even when neglected.

In a case where, in such circuit, current flowing through the magnetization reactance $x_m$ (it is a current contributive to a magnetic flux, and hereinbelow, it shall be called "magnetizing current" and denoted by $I_m$) and current flowing through the secondary circuit $r_2'$ (it is a current contributive to a torque, and hereinbelow, it shall be called "torque current" and denoted by $I_t$) are controlled independently of each other, the value of the input voltage (hereinbelow, denoted by $V_{dc}$) of frequency conversion means needs to be determined as follows. In case of employing an inverter as the frequency conversion means, the maximum output of the output line voltage of the inverter becomes a waveform shown in FIG. 2, and the maximum value of the fundamental wave becomes $$(2\sqrt{3}/\pi) \times V_{dc}.$$

The fundamental wave voltage needs to be greater than the terminal voltage of the induction motor when a voltage drop component in the inverter, a voltage drop component attributed to a line resistance, etc. are taken into account. It needs to satisfy the following equation for the rated values of the currents $I_m$ and $I_t$, in consideration of the highest rotational frequency at which the induction motor can be operated at a rated torque:

$$(2\sqrt{3}/\pi) \times V_{dc} >> \sqrt{3} \times \sqrt{2} \times \qquad (1)$$
$$|\{j\,x_m I_m + (r_1 + j\,x_1)(I_m + I_t)\}|$$

When the voltage $V_{dc}$ is selected at that minimum value determined by Equation (1) with which an actual primary current $I_1$ can precisely follow up a primary current command value (hereinbelow, the minimum value shall be called the "rated input voltage of the inverter"), the control apparatus is economical in view of the breakdown voltage characteristics of the main switching elements of the inverter. However, in case of holding $I_m$ constant steadily and controlling $I_t$ in accordance with a required torque, $I_m$ cannot flow as instructed and lowers when $V_{dc}$ has become lower than the aforementioned rated input voltage.

In many of vector controls, $I_m$ is held constant, and $I_t$ is controlled in accordance with a required torque. However, in a case where the input side voltage of the frequency conversion means has lowered; when the command value of $I_m$ is set at a constant value, it is sometimes the case that $I_m$ as instructed cannot flow. This has sometimes led to an unstable control system, a worsened torque response, and the occurrence of the drawbacks of velocity hunting etc.

SUMMARY OF THE INVENTION

The present invention has been made in view of such points, and has for its object to provide a control apparatus for induction motors which can perform a stable control even when an input voltage has fluctuated.

The present invention concerns the control of an induction motor employing frequency conversion means, and is characterized in that $I_m$ can be instructed in accordance with the magnitude of the input side voltage of the frequency conversion means.

As the frequency conversion means, a cycloconverter or an inverter can be employed. The inverter, which produces an A.C. output from a D.C. input, can be deemed a kind of frequency conversion means when it is construed as changing the null frequency into an alternating current of predetermined frequency.

FIG. 3 is a vector diagram of various parts in an induction motor. In this figure, $\dot{I}_m$ denotes a magnetizing current which flows through a magnetization reactance, $\dot{I}_t$ a torque current which flows through a secondary circuit, $\dot{I}_1$ a primary current, and $\dot{V}_m$ a voltage which is induced by the magnetization reactance and which is equal to $x_m \times \dot{I}_m$. $\dot{V}_r$ denotes a voltage drop which is ascribable to the primary current and a primary resistance, and which is equal to $r_1 \times \dot{I}_1$. $\dot{V}_x$ indicates a voltage drop which is ascribable to the primary current and a primary leakage reactance, and which is equal to $\dot{I}_1 \times x_1$. $\dot{v}_1$ indicates a primary voltage.

Here, an angle defined between $\dot{I}_m$ and $\dot{I}_t$ is 90 degrees, and letting $\alpha$ denote an angle defined between $I_m$ and $\dot{I}_1$, the following equations hold:

$$v_1 = \sqrt{(x_1|\dot{I}_1|\sin\alpha - r_1|\dot{I}_1|\cos\alpha)^2 + (x_m I_m + x_1|\dot{I}_1|\cos\alpha + r_1|\dot{I}_1|\sin\alpha)^2} \qquad (2)$$

$$|\dot{I}_1| = \sqrt{I_m^2 + I_t^2} \qquad (3)$$

$$\alpha = \tan^{-1}(I_t/I_m) \qquad (4)$$

Substituting Equations (3) and (4) into Equation (2), $$v_1 = \sqrt{(x_1 I_t - r_1 I_m)^2 + \{(x_m + x_1)I_m + r_1 I_t\}^2} \qquad (5)$$

is obtained. Here, the following holds:

$$(x_1 I_t - r_1 I_m)^2 << \{(x_m + x_1)I_m + r_1 I_t\}^2 \qquad (6)$$

Accordingly, Equation (5) becomes:

$$v_1 \approx (x_m + x_1)I_m + r_1 I_t \qquad (7)$$

When $V_{dc}$ is given, the following must be satisfied according to the same concept as in the case of deriving Equation (1):

$$(2\sqrt{3}/\ )V_{dc} >> \sqrt{3} \times \sqrt{2}\ v_1 \qquad (8)$$

$I_t$, $r_1$, $x_1$ and $x_m$ are determined by the characteristics of the induction motor. Therefore, when the value of $v_1$ has been found, $I_m$ can be obtained in accordance with Equation (9):

$$I_m \approx \frac{v_1 - r_1 I_t}{(x_m + x_1)} \qquad (9)$$

When $I_m$ has been obtained, $I_1$ can be evaluated according to Equation (3) by substituting $I_m$ and $I_t$ thereinto, so that the current can be caused to flow as instructed, in consideration of $V_{dc}$. The value of $V_{dc}$ is detected by voltage detection means. In this regard, in case of employing a PWM inverter as the frequency conversion means, the value of $V_{dc}$ can also be detected on the output side of the inverter by detecting the amplitude value of a pulse wave.

DESCRIPTION OF THE PREFERRED EMBODIMENTS

Figure 1:
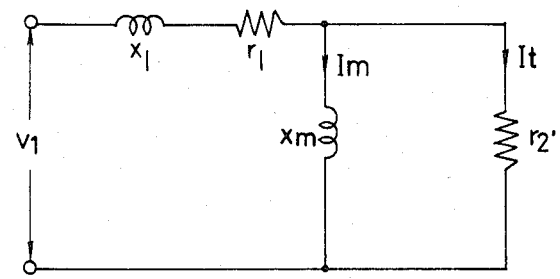
FIG. 1 is an equivalent circuit diagram of an induction motor.
Figure 2:
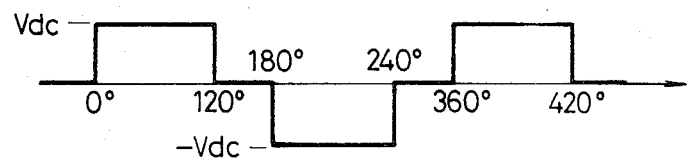
FIG. 2 is a diagram showing an example of the output voltage waveform of an inverter.
Figure 3:
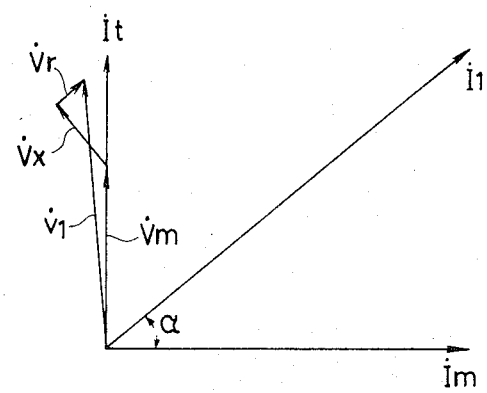
FIG. 3 is a vector diagram showing the relationship of the voltages and currents of the induction motor.

Now, an embodiment of the present invention shown in FIG. 4 will be described. Numeral 1 designates a three-phase A.C. power source, and numeral 2 a three-phase induction motor. Numerals 3 and 4 indicate a three-phase full-wave rectifier circuit and a vector control inverter as frequency conversion means, respectively, which are connected between the power source 1 and the motor 2.

The inverter 4 is composed of six transistors 5a–5f, and six feedback diodes 6a–6f.

Numeral 7 indicates a speed setting unit, numeral 8 a speed detecting unit which generates pulses in a number proportional to the rotational speed of the motor 2, and numeral 9 a converter circuit which receives the output of the speed detecting unit 8 to convert it into an analog signal proportional to the rotational speed of the motor 2.

A subtractor 10 subtracts the output of the converter circuit 9 from the output of the speed setting unit 7, while an error amplifier circuit 11 calculates the output of the subtractor 10 by the proportional integral action. The output of the circuit 11 becomes a torque current component command $I_t$, which is sent to a vector calculator circuit 12 and a slip angular frequency output circuit 13.

Shown at numeral 14 is an adder, which adds the output signal of the converter circuit 9, namely, an actual angular velocity $\omega_r$ and the output $\omega_s$ of the slip angular frequency output circuit 13 so as to provide $\omega_1 = \omega_r + \omega_s$ as its output, wherein $\omega_1$ represents an angular frequency which is to be given to the motor 2, and which is sent to a voltage-controlled oscillator circuit 15. Here, it is converted into a sine wave signal $\sin \omega_1$ and a cosine wave signal $\cos \omega_1$ which have angular frequencies synchronous to $\omega_1$, and which are sent to the vector calculator circuit 12.

Numeral 16 designates magnetizing current component-setting means for giving the magnetizing current component command $I_m$ of the motor 2. It receives the input voltage $V_{dc}$ of the inverter 4 from voltage detection means 30, to evaluate $v_1$ on the basis of the relation of Equation (8) mentioned before and to evaluate the magnetizing current component command $I_m$ by substituting $I_{tmax}$ for $I_t$ in Equation (9). $I_{tmax}$ represents that maximum value of $I_t$ which is stipulated according to the ratings of the induction motor and the maximum allowable current of the inverter.

In the vector calculator circuit 12, the magnetizing current component command $I_m$ has its phase retarded by 90 degrees with respect to the torque current component command $I_t$, whereupon it becomes two-phase A.C. signals $i_m'$ and $i_t'$ having the angular frequency $\omega_1$. The two-phase A.C. signals $i_m'$ and $i_t'$ are converted into three phases by a two-phase-to-three-phase changer circuit 17.

A current comparator circuit 18 receives phase currents detected by current detectors 19, and compares their values with the outputs of the two-phase-to-three-phase changer circuit 17. It creates "on" and "off" signals so that the resulting differences may fall within a predetermined value, and it sends these signals to a transistor driver circuit 20. The transistor driver circuit 20 controls the transistors 5a–5f. As a result, the motor 2 is controlled to the velocity set by the speed setting unit 7, in favorable response thereto.

Torque current component command means is generally denoted by numeral 40, while control means is generally denoted by numeral 50. Letter C denotes a smoothing capacitor.

Figure 5:
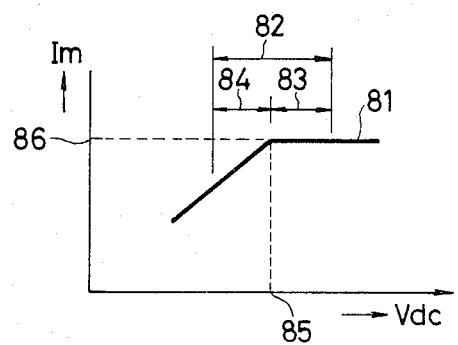
FIG. 5 is a diagram showing the relationship of a magnetizing current versus an input voltage.

The input/output characteristics of the magnetizing current component command means 16 are set at a pattern shown in FIG. 5 so as to meet Equations (8) and (9) mentioned before. In FIG. 5, the abscissa represents the foregoing voltage $V_{dc}$, while the ordinate represents the magnetizing current component command value $I_m$. Numeral 81 indicates an input/output characteristic curve, numeral 82 the operating range of the induction motor 2, numeral 83 a rated torque region, numeral 84 a reduced torque region in which the motor is operated with a torque lower than the rated torque, numeral 85 the D.C. input voltage of the inverter at which the rated torque and the reduced torque are changed-over and which is the rated input voltage of the inverter described before, and numeral 86 the rated value of the magnetizing current command value.

Figure 4:
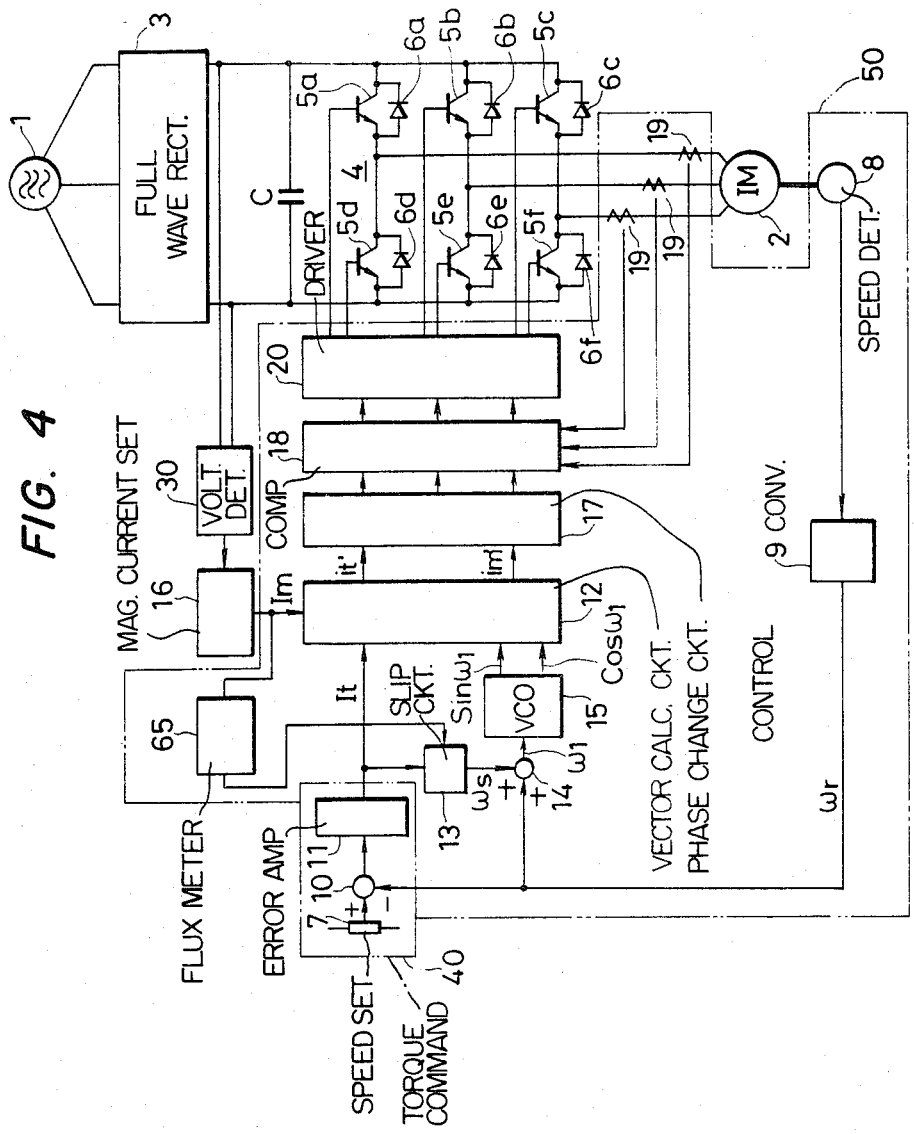
FIG. 4 is a circuit diagram showing an embodiment of the apparatus of the present invention.

While the motor is being operated in the rated torque region with the inverter D.C. input voltage being at least equal to the rated value, the magnetizing current constant value component command value $i_m$ in FIG. 4 becomes its rated value, and also the output of a fluxmeter 65 becomes its rated value. On the other hand, the slip angular frequency $\omega_s$ is expressed by the following equation where $\phi_n$ denotes the rated value of a magnetic flux, $I_t$ the torque current and $K_1$ a proportion constant:

$$\omega_s = K_1(I_t/\phi_n) \tag{10}$$

This calculation is conducted by the slip angular frequency output circuit 13. This value $\omega_s$ and the actual velocity $\omega_r$ of the induction motor are added to become the primary angular frequency $\omega_1$. Owing to the magnetizing current component command value $i_m$, torque current component command value $i_t$ and primary angular frequency $\omega_1$ mentioned above, primary currents in three phases are instructed. They are subjected to power amplification by the inverter 4, whereby the velocity control of the induction motor is performed. A torque $\tau_n$ generated by the induction motor in this case becomes:

$$\tau_n = K_2 \cdot \phi_n \cdot I_t \tag{11}$$

where $K_2$ denotes a proportion constant.

In a case where the inverter D.C. input voltage has lowered to be less than the rated input voltage, the magnetizing current command value is responsively decreased in accordance with the characteristics of FIG. 5, so as to cause the instructed magnetizing current to flow.

When $I_m$ has changed, the magnetic flux $\phi$ is expressed by the following equation where $l_m$ denotes the magnetization inductance of the equivalent circuit of the induction motor shown in FIG. 1, and S a Laplace operator:

$$\phi = I_m \cdot l_m / \{1 + S(l_m/r_2')\} \tag{12}$$

This calculation is conducted by the flux calculating circuit 65, and the calculation of the slip angular frequency is conducted by substituting $\phi_n$ for $\phi$ into Equation (9) similarly to the foregoing. The torque $\tau$ generated by the induction motor in this case is expressed by $\tau = K_2 \cdot \phi \cdot I_t$. Letting $K_3$ denote the ratio of $\phi$ to the rated value $\phi_n$ of the magnetic flux, $\tau = K_2 \cdot K_3 \phi_n I_t = K_3 \tau_n$ holds, and a torque lower than the torque of the rated input voltage is produced. However, the linearity of the generated torque to the torque current command value is not lost, and a favorable velocity response is attained.

Figure 6:
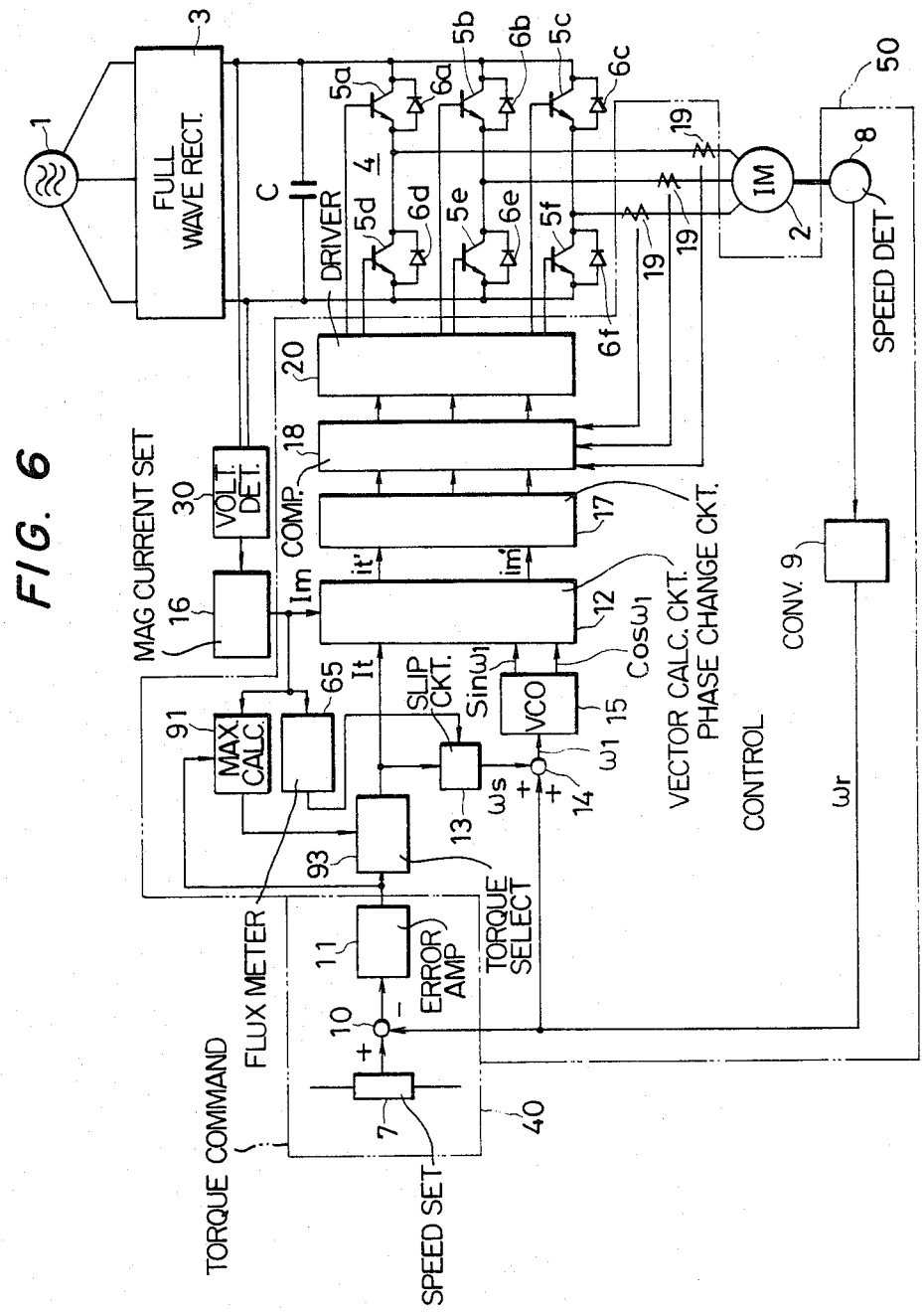
FIG. 6 is a circuit diagram showing a different embodiment of the present invention.

FIG. 6 shows another embodiment of the present invention. This embodiment is additionally provided with a circuit 91 which calculates the maximum value $I_{t\,max}'$ of the torque current in accordance with Equation (13) when the magnetizing current component command value $I_m$ has been given:

$$I_{t\,max}' = \sqrt{I_1^2 - I_m^2} \tag{13}$$

where $I_1$ denotes the rated primary current at the time at which the magnetizing current component command assumes a value in the section 83 shown in FIG. 5.

A torque current command value-selector circuit 93 is also added. This selector circuit 93 delivers the output of the error amplifier circuit 11 when this output is smaller than or equal to the output of the circuit 91, while it delivers the output of the circuit 91 as it is when the output of the error amplifier circuit 11 is greater than that of the circuit 91. The others are the same as the embodiment shown in FIG. 4.

Figure 7:
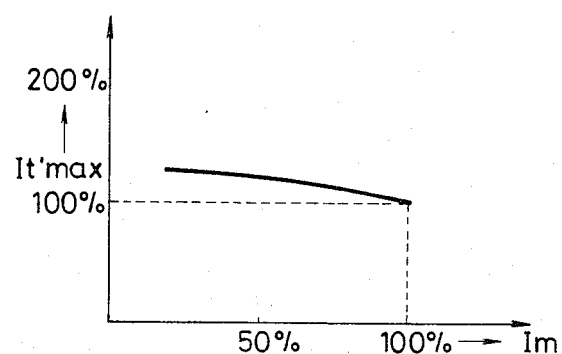
FIG. 7 is a diagram showing the relationship of a torque current versus a magnetizing current.

FIG. 7 shows the characteristic of the circuit 91, which is the relationship of $I_{t\,max}'$ to the command value of $I_m$.

The present invention is not restricted to the foregoing embodiments, but various modifications are possible.

By way of example, while the embodiments have referred to the case of using the current reference inverter control, the invention can also be performed in case of using a voltage reference inverter control.

The voltage detection means is also permitted to detect a voltage on the input side of the rectifier circuit.

What we claim is:

1. In a control apparatus for an induction motor wherein frequency conversion means is connected between a power source and the induction motor so as to energize the induction motor through the frequency conversion means; a control apparatus for an induction motor comprising voltage detection means for detecting a magnitude of an input voltage of said frequency conversion means, magnetizing current component command means for setting a magnetizing current component command of the induction motor in accordance with the detected information of said detection means so as to reduce a magnetizing current component when said detection means detects lowering of the input voltage, torque current component command means for setting a torque current component command of the induction motor in accordance with the detected information of said detection means, and control means for causing said frequency conversion means to control primary current of the induction motor so as to aim at the values instructed by said torque current component command means and said magnetizing current component command means.

2. In a control apparatus for an induction motor wherein frequency conversion means is connected between a power source and the induction motor so as to energize the induction motor through the frequency conversion means; a control apparatus for an induction motor comprising voltage detection means for detecting a magnitude of an input voltage of said frequency conversion means, magnetizing current component command means for setting a magnetizing current component command for the induction motor on the basis of the detected information of said detection means so as to decrease a magnetizing current component when said detection means has detected lowering in the input voltage, torque current component command means for setting a torque current component command of the induction motor on the basis of the detected information of said detection means so as to increase a torque current component when said detection means has detected the lowering in the input voltage, and control means for causing said frequency conversion means to control primary current of the induction motor so as to aim at the values instructed by said torque current component command means and said magnetizing current component command means.

3. In a control apparatus for an induction motor wherein an inverter is connected between a power source and the induction motor so as to energize the induction motor through the inverter; a control apparatus for an induction motor comprising voltage detection means for detecting a magnitude of an input voltage of said inverter, magnetizing current component command means for setting a magnetizing current component command of the induction motor on the basis of the detected information of said detection means so as to decrease a magnetizing current component when said detection means has detected lowering in the input voltage, torque current component command means for setting a torque current component command of the induction motor on the basis of the detected information of said detection means so as to increase a torque current component when said detection means has detected the lowering in the input voltage, and control means for causing said inverter to control primary current of the induction motor so as to aim at the values instructed by said torque current component command means and said magnetizing current component command means.

4. A control apparatus according to claim 1, wherein said frequency conversion means is a pulse width modulation inverter.

5. A control apparatus according to claim 1, wherein said voltage detection means provides an output indicative of the magnitude of the input voltage of said frequency conversion means and detects the magnitude of the input voltage of said frequency conversion means lowering below a predetermined value, said magnetizing current component means being responsive to the detected lowering of the input voltage for reducing the magnetizing current component in accordance therewith.

6. A control apparatus according to claim 2, wherein said frequency conversion means is a pulse width modulation inverter.

7. A control apparatus according to claim 2, wherein said voltage detection means provides an output indicative of the magnitude of the input voltage of said frequency conversion means and detects the lowering of the magnitude of the input voltage below a predetermined value, said magnetizing current component command means being responsive to the detected lowering of the magnitude of the input voltage for decreasing the magnetizing current component in accordance therewith, said torque current component command means being responsive to the detected lowering of the magnitude of the input voltage for increasing the torque current component in accordance therewith.

8. A control apparatus according to claim 3, wherein said inverter is a pulse width modulation inverter.

9. A control apparatus according to claim 3, wherein said voltage detection means provides an output indicative of the magnitude of the input voltage of said inverter and for detecting the lowering of the magnitude of the input voltage below a predetermined value, said magnetizing current component command means being responsive to the lowering of the magnitude of the input voltage for decreasing the magnetizing current component in accordance therewith, and said torque current component command means being responsive to the lowering of the magnitude of the input voltage for increasing the torque current component in accordance therewith.

* * * * *